US012192711B2

(12) United States Patent
Kobayashi et al.

(10) Patent No.: US 12,192,711 B2
(45) Date of Patent: Jan. 7, 2025

(54) SPEAKER CALIBRATION METHOD, APPARATUS AND PROGRAM

(71) Applicant: NIPPON TELEGRAPH AND TELEPHONE CORPORATION, Tokyo (JP)

(72) Inventors: Kazunori Kobayashi, Tokyo (JP); Ryotaro Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 174 days.

(21) Appl. No.: 17/921,555

(22) PCT Filed: Jun. 4, 2020

(86) PCT No.: PCT/JP2020/022102
§ 371 (c)(1),
(2) Date: Oct. 26, 2022

(87) PCT Pub. No.: WO2021/245876
PCT Pub. Date: Dec. 9, 2021

(65) Prior Publication Data
US 2023/0171555 A1 Jun. 1, 2023

(51) Int. Cl.
*H04R 29/00* (2006.01)
*H04R 1/40* (2006.01)

(52) U.S. Cl.
CPC ........... *H04R 29/001* (2013.01); *H04R 1/403* (2013.01); *H04R 2201/40* (2013.01); *H04R 2430/20* (2013.01)

(58) Field of Classification Search
None
See application file for complete search history.

(56) References Cited

U.S. PATENT DOCUMENTS 9,813,804 B2 * 11/2017 Franck .................... H04R 1/323
2021/0241746 A1 * 8/2021 Osako ................ G10K 11/1752

OTHER PUBLICATIONS

Nishikawa, K. (2010) "Compact array speaker with characteristic directivity" Kanazawa University New Technology Presentation Meeting, Friday, Aug. 6, 2010 [online] Accessed on May 11, 2020, website: https://shingi.jst.go.jp/past_abst/abst/p/10/1022/kanazawa3.pdf, with its English translation generated by a computer.

* cited by examiner

*Primary Examiner* — James K Mooney

(57) ABSTRACT

There are included a first speaker processing step in which a first speaker 2 produces sound based on a first filtered signal, a gain multiplication step in which a gain multiplication unit 4 generates a gain multiplied signal by multiplying a second filtered signal by a gain, a second speaker processing step in which a second speaker 5 produces sound based on the gain multiplied signal, and a gain control step in which a gain control unit 7 controls the gain such that a root mean square of a collected sound signal collected by a microphone 6 installed at a mute position, which is a position at which the sound produced by the first speaker and the sound produced by the second speaker are to be muted, is relatively small.

6 Claims, 7 Drawing Sheets

SPEAKER CALIBRATION METHOD, APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2020/022102, filed on 4 Jun. 2020, the disclosure of which is hereby incorporated herein by reference in its entirety.

TECHNICAL FIELD

The present invention relates to a technology of providing directivity by using two speakers.

BACKGROUND ART

There are known technologies for filtering one-channel input signal by using two-channel filter coefficients and outputting the signals from two speakers (refer to, for example, Non-Patent Literature 1). The filter coefficients are predetermined such that sound is reproduced at a high volume level toward a predetermined playback position and at a low volume level toward a mute position.

CITATION LIST

Non-Patent Literature

Non-Patent Literature 1: Nishikawa, K., "Compact array speaker with characteristic directivity", [online]. Friday, Aug. 6, 2010. Kanazawa university new technology presentation meeting. [retrieved May 11, 2020] from Internet <URL: https://shingi.jst.go.jp/past_abst/abst/p/10/1022/kanazawa3.pdf>

SUMMARY OF THE INVENTION

Technical Problem

The methods of the background art, however, have possibilities that aimed directivity characteristics are not achieved when two speakers are different from each other with respect to their characteristics due to variations in characteristics caused in speaker manufacturing or changes with time. The variations in characteristics here mean variations in, for example, the frequency characteristic and the conversion efficiency.

An object of the present invention is to provide a device, a method, and a program for speaker calibration that can enable the achievement of desired directivity characteristics when there are variations in characteristics caused in speaker manufacturing or variations in characteristics due to changes with time.

Means for Solving the Problem

A method for speaker calibration according to an aspect of the present invention includes a first filter processing step in which a first filter processing unit generates a first filtered signal by filtering an input signal, a first speaker processing step in which a first speaker produces sound based on the first filtered signal, a second filter processing step in which a second filter processing unit generates a second filtered signal by filtering the input signal, a gain multiplication step in which a gain multiplication unit generates a gain multiplied signal by multiplying the second filtered signal by a gain, a second speaker processing step in which a second speaker produces sound based on the gain multiplied signal, and a gain control step in which a gain control unit controls the gain such that a root mean square of a collected sound signal collected by a microphone installed at a mute position, which is a position at which the sound produced by the first speaker and the sound produced by the second speaker are to be muted, is relatively small.

Effects of the Invention

It is possible to achieve desired directivity characteristics when there are variations in characteristics caused in speaker manufacturing or variations in characteristics due to changes with time.

DESCRIPTION OF EMBODIMENTS

Figure 1:
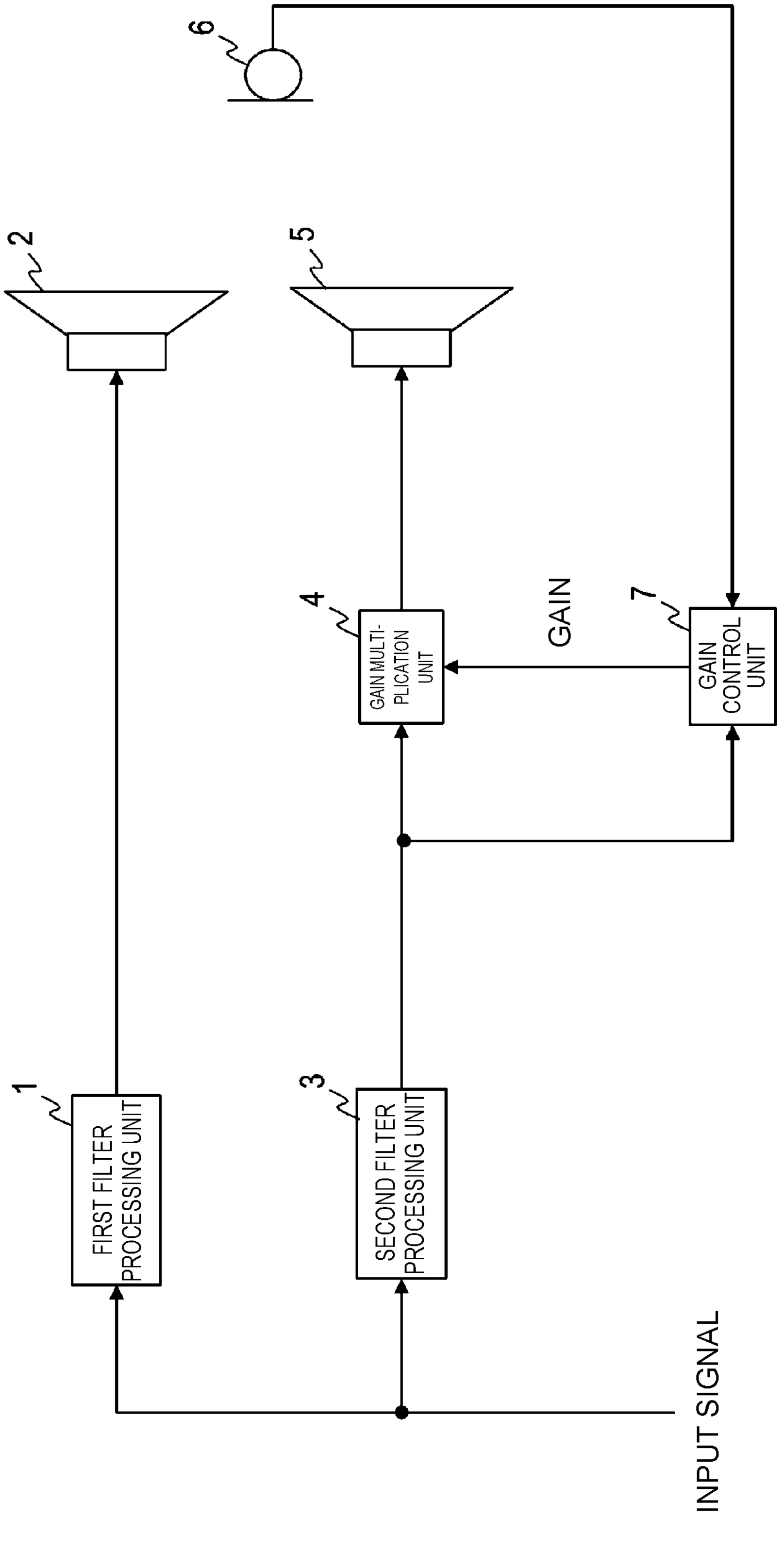
FIG. 1 illustrates an example of a functional configuration of a device for speaker calibration according to a first embodiment.

Hereinafter, embodiments of the present invention will be described in detail. It should be noted that constituent elements having the same functions are denoted by the same numerals in the drawings, and redundant descriptions thereof are omitted.

First Embodiment

As illustrated in FIG. 1, a device for speaker calibration according to a first embodiment includes, for example, a first filter processing unit 1, a first speaker 2, a second filter processing unit 3, a gain multiplication unit 4, a second speaker 5, a microphone 6, and a gain control unit 7.

Figure 2:
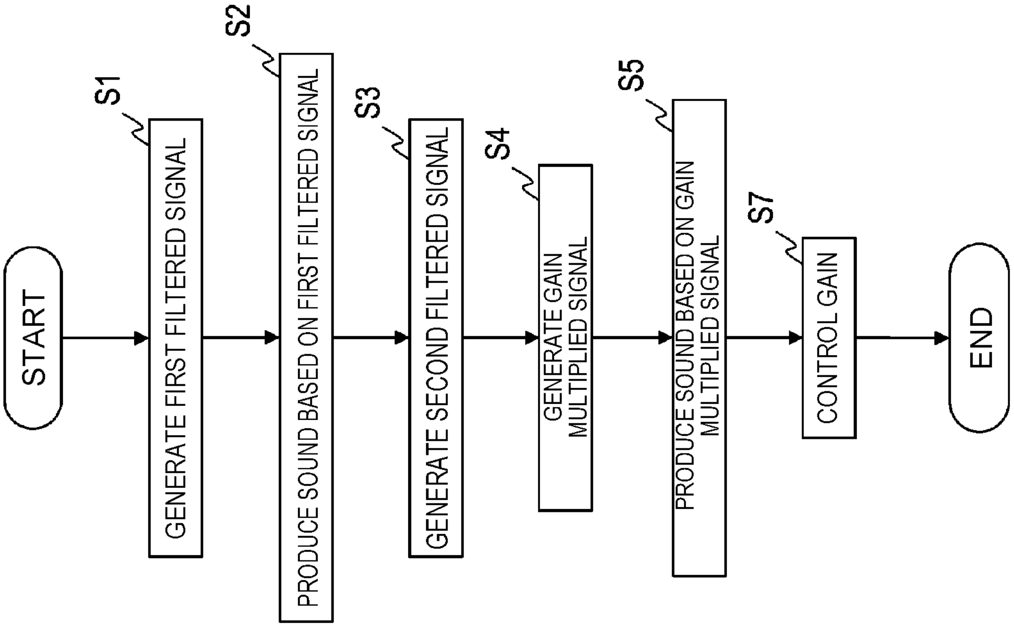
FIG. 2 illustrates an example of an operational procedure of a method for speaker calibration.

A method for speaker calibration is implemented by, for example, the constituent elements of the device for speaker calibration performing operations in steps S1 to S7 described later and illustrated in FIG. 2.

The following provides descriptions of the constituent elements of the device for speaker calibration.

The first filter processing unit 1 generates a first filtered signal by filtering an input signal (step S1). The generated first filtered signal is outputted to the first speaker 2.

The first filter processing unit 1 performs filtering with a one-channel filter coefficient of predetermined two-channel filter coefficients. By contrast, the second filter processing unit 3 described later performs filtering with the other one-channel filter coefficient of the predetermined two-channel filter coefficients. These filter coefficients are set in, for example, the same manner as known technologies.

The first speaker 2 produces sound based on the first filtered signal (step S2).

The second filter processing unit 3 generates a second filtered signal by filtering the input signal (step S3). The generated second filtered signal is outputted to the gain multiplication unit 4 and the gain control unit 7.

The gain multiplication unit 4 generates a gain multiplied signal by multiplying the second filtered signal by a gain (step S4). The generated gain multiplied signal is outputted to the second speaker 5. The gain used by the gain multiplication unit 4 is a gain obtained by the gain control unit 7.

The second speaker 5 produces sound based on the gain multiplied signal (step S5).

The microphone 6 is installed at a mute position at which the sound produced by the first speaker 2 and the sound produced by the second speaker 5 are to be muted.

The gain control unit 7 controls gain such that the root mean square of collected sound signals collected by the microphone 6 is relatively small (step S7). The controlled gain is outputted to the gain control unit 7.

The gain control unit 7 sets, by using, for example, a second filtered signal x(t) obtained as an input signal by the gain multiplication unit 4 and a collected sound signal e(t), the value of a gain g(t) to be used for multiplying by the gain multiplication unit 4. For example, by performing the following process, gain can be controlled such that the root mean square of collected sound signals is relatively small.

The gain control unit 7 updates the value of gain in accordance with, for example, the following expression: $g(t+1)=g(t)-\alpha\cdot x(t)e(t)$, where t is a discrete time, and $\alpha$ is the size of update step determined within the range of, for example, $0<\alpha\leq 1$.

It should be noted that an impulse response characteristic c(t) may be previously measured between the second speaker 5 coupled to the gain multiplication unit 4 and the microphone 6; the gain control unit 7 may updates the gain value in accordance with the following expression: $g(t+1)=g(t)-\alpha\cdot x'(t)e(t)$, where x'(t) indicates a signal obtained by convolution using the impulse response characteristic c(t) and the second filtered signal x(t).

Figure 6:
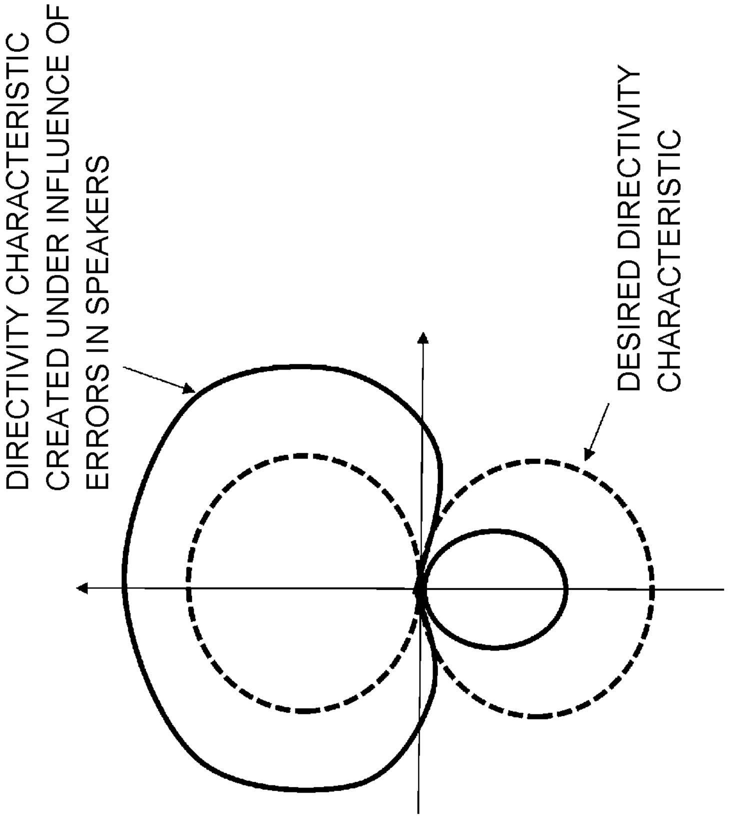
FIG. 6 illustrates an example of an effect of the device and method for speaker calibration.

As described above, the gain value is updated such that the root mean square of collected sound signals collected by the microphone 6 is at a lowest level, and as a result, desired directivity characteristics can be achieved. For example, the device for speaker calibration can provide a desired directivity characteristic indicated by a dashed line in FIG. 6. In FIG. 6, a solid line indicates a directivity characteristic created under the influence of errors in speakers.

Second Embodiment

A device for speaker calibration according to a second embodiment is configured by adding two low-pass filters to the configuration of the first embodiment. More specifically, in the second embodiment, two kinds of input signals inputted to the gain control unit 7 are both low-pass filtered.

The following mainly describes portions different from the first embodiment. Descriptions of the portions identical to the first embodiment are omitted.

Figure 3:
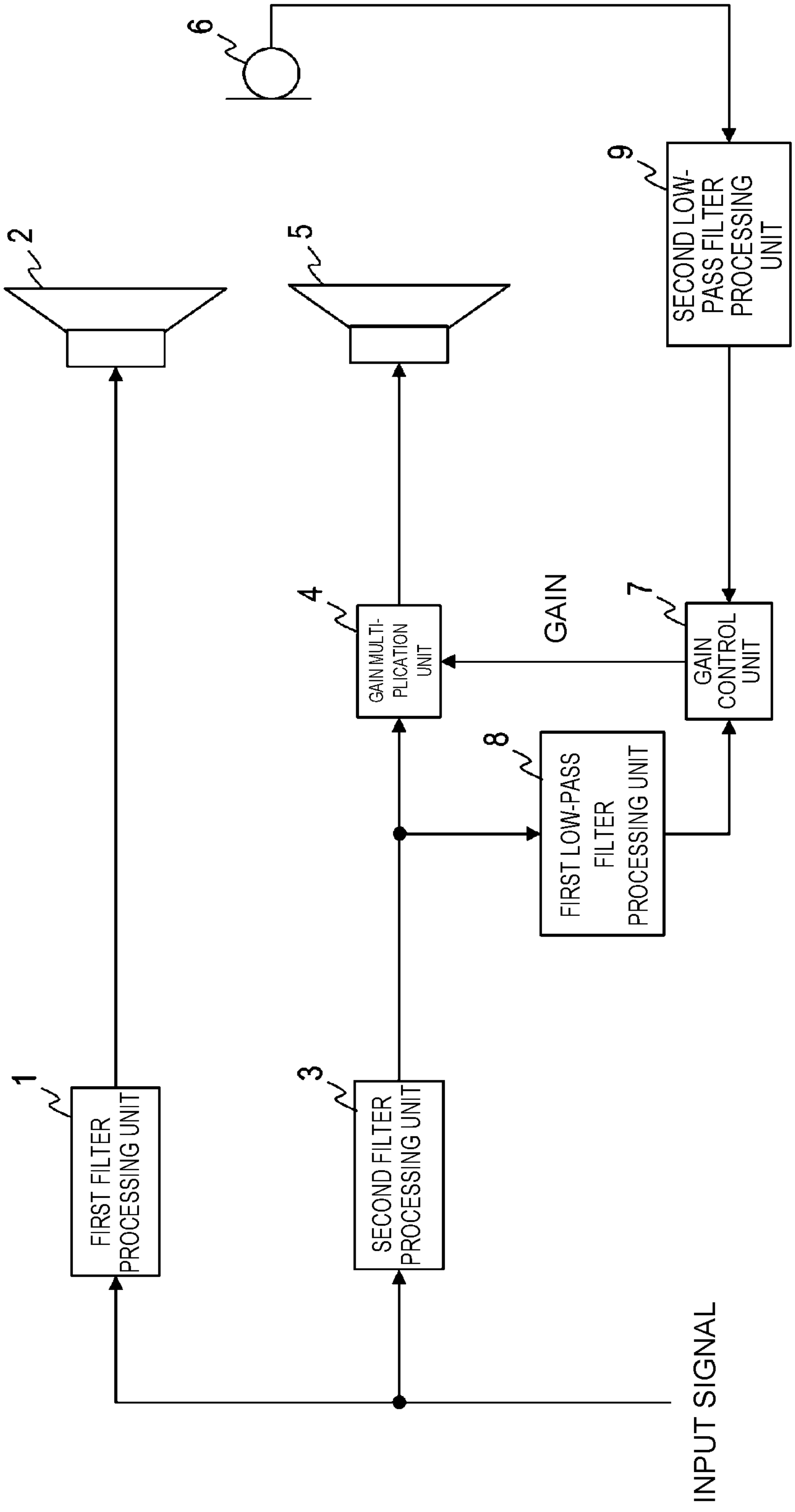
FIG. 3 illustrates an example of a functional configuration of a device for speaker calibration according to a second embodiment.

As illustrated in FIG. 3 as an example, the device for speaker calibration according to the second embodiment further includes a first low-pass filter processing unit 8 and a second low-pass filter processing unit 9.

The first low-pass filter processing unit 8 generates a first low-pass filtered signal by low-pass filtering the second filtered signal generated by the second filter processing unit 3. The generated first low-pass filtered signal is outputted to the gain control unit 7.

The second low-pass filter processing unit 9 generates a second low-pass filtered signal by low-pass filtering the collected sound signal. The generated second low-pass filtered signal is outputted to the gain control unit 7.

The gain control unit 7 controls gain by using the first low-pass filtered signal and the second low-pass filtered signal such that the root mean square of the second low-pass filtered signals is relatively small. The operation of the gain control unit 7 according to the second embodiment is identical to the operation of the gain control unit 7 according to the first embodiment, except that the gain control unit 7 according to the second embodiment uses the first low-pass filtered signal and the second low-pass filtered signal instead of the second filtered signal x(t) and the collected sound signal e(t).

As described above, by low-pass filtering two kinds of input signals inputted to the gain control unit 7, it is possible to control gain with the use of only signals in low-frequency ranges. In general, speaker characteristics greatly vary with signals in high-frequency ranges, and thus, it is difficult to provide directivity. Because only low-frequency ranges are used to calibrate speaker characteristics as described above, calibration can be performed while making good use of directivity characteristics in low-frequency ranges.

Third Embodiment

A device for speaker calibration according to a third embodiment is configured by adding a delay unit 10 to the configuration of the first or second embodiment.

The following mainly describes portions different from the first and second embodiments. Descriptions of the portions identical to the first or second embodiment are omitted.

Figure 4:
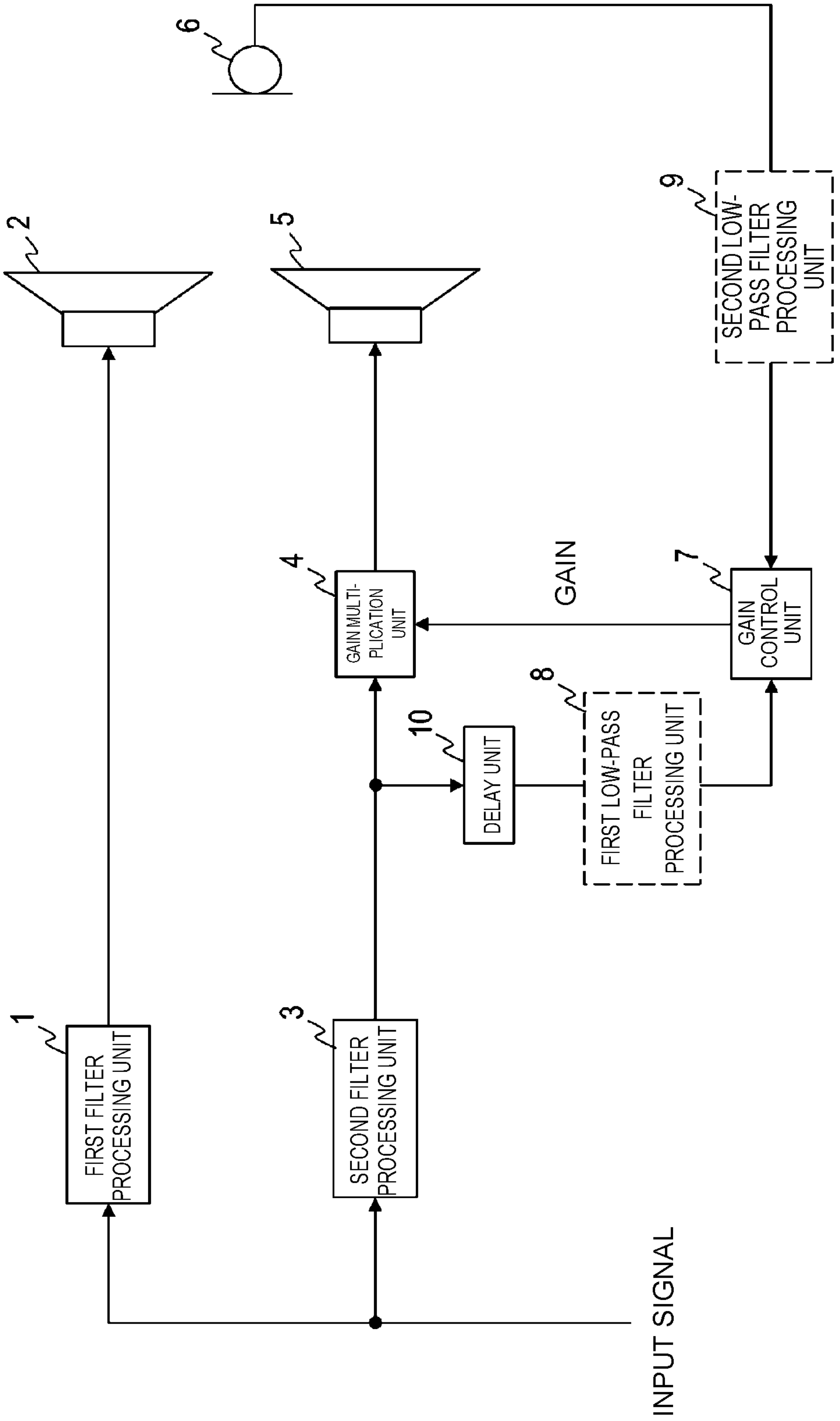
FIG. 4 illustrates an example of a functional configuration of a device for speaker calibration according to a third embodiment.

As illustrated in FIG. 4 as an example, the device for speaker calibration according to the third embodiment further includes the delay unit 10. As indicated by dashed lines in FIG. 4, the device for speaker calibration according to the third embodiment may further include the first low-pass filter processing unit 8 and the second low-pass filter processing unit 9 that are described in the second embodiment.

The delay unit 10 delays, of the input signals to be inputted to the gain control unit 4, the input signal to be inputted to the gain multiplication unit 4; in other words, the delay unit 10 delays the second filtered signal generated by the second filtering processing unit 3.

The length of delay may be set to, for example, the value obtained by dividing the distance from the second speaker 5 coupled to the gain multiplication unit 4 to the microphone 6 by the acoustic velocity. As such, instead of measuring the impulse response characteristic c(t) between the second speaker 5 coupled to the gain multiplication unit 4 and the microphone 6, the delay can be used as an approximation of the impulse response characteristic c(t).

Fourth Embodiment

A device for speaker calibration according to a fourth embodiment is configured such that, in any of the first to third embodiments, gain is controlled with respect to individual bands by using band division.

The following mainly describes portions different from the first to third embodiments. Descriptions of the portions identical to the first, second, or third embodiment are omitted.

Figure 5:
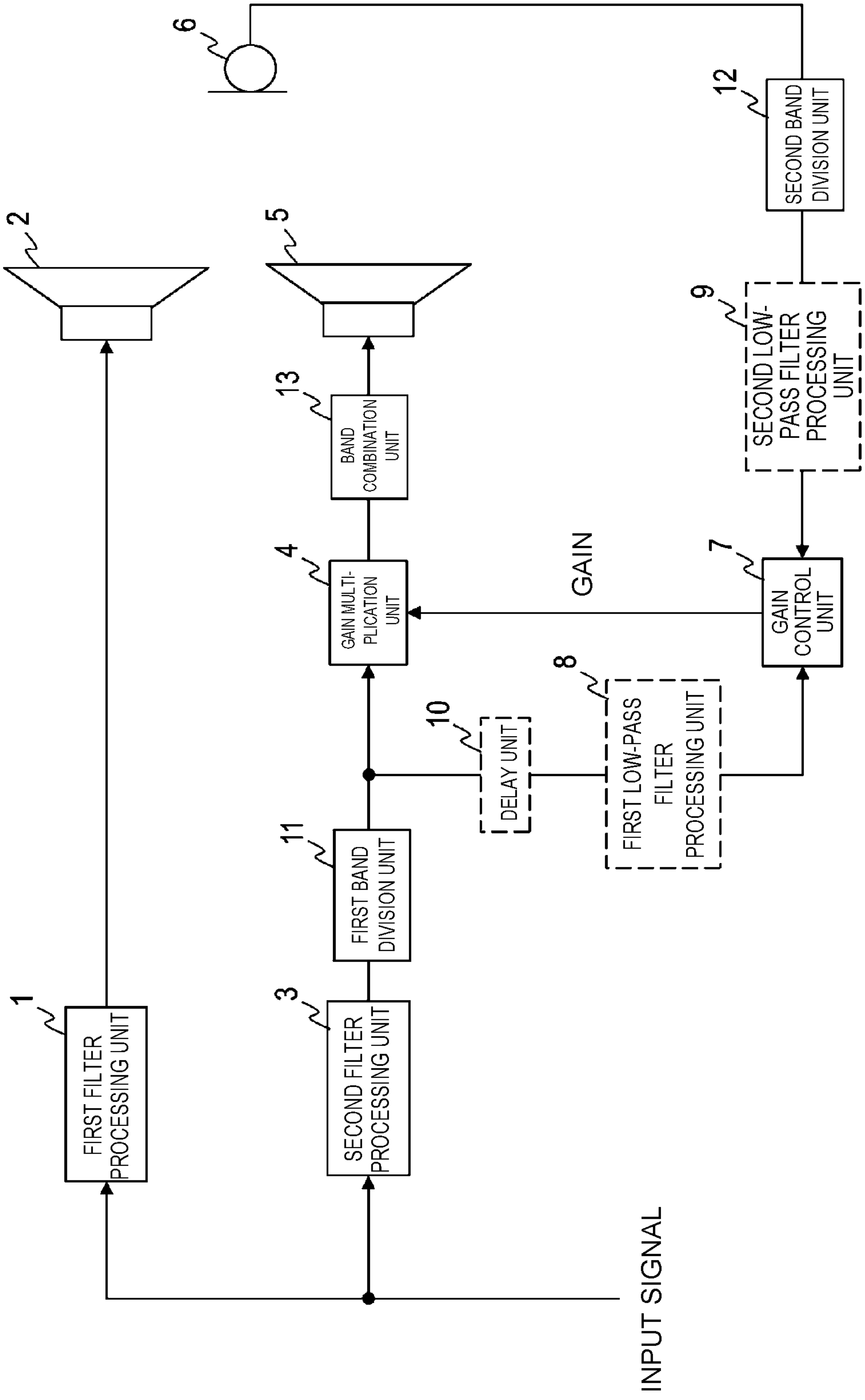
FIG. 5 illustrates an example of a functional configuration of a device for speaker calibration according to a fourth embodiment.

As illustrated in FIG. 5 as an example, the device for speaker calibration according to the fourth embodiment further includes a first band division unit 11, a second band division unit 12, and a band combination unit 13. As indicated by dashed lines in FIG. 5, the device for speaker calibration according to the fourth embodiment may further include the first low-pass filter processing unit 8, the second low-pass filter processing unit 9, and the delay unit 10 that are described in the second or third embodiment.

The first band division unit 11 divides the second filtered signal generated by the second filtering processing unit 3 under a plurality of bands. For example, the first band division unit 11 generates second filtered signal divisions k (k=1, . . . , K) by dividing the second filtered signal under a number K of bands, where K is a positive integer equal to or greater than 2.

The second band division unit 12 divides the collected sound signal collected by the microphone 6 under a plurality of bands. For example, the second band division unit 12 generates collected sound signal divisions k (k=1, . . . , K) by dividing the collected sound signal under the number K of bands.

The gain multiplication unit 4, the gain control unit 7, the first low-pass filter processing unit 8, the second low-pass filter processing unit 9, and the delay unit 10 perform the corresponding operations for the individual signal divisions obtained by dividing the second filtered signal under the plurality of bands or the individual signal divisions obtained by dividing the collected sound signal under the plurality of bands.

More specifically, given that k=1, . . . , K, the gain multiplication unit 4, the first low-pass filter processing unit 8, and the delay unit 10 perform the corresponding operations for the divided second filtered signal k; the second low-pass filter processing unit 9 performs the corresponding operation for the divided collected sound signal k; and the gain control unit 7 performs the corresponding operation for the divided second filtered signal k and the divided collected sound signal k.

The band combination unit 13 combines together the signal divisions of the gain multiplied signal generated for the individual bands. For example, when the signals divided into the number K of divisions are processed, and the number K of gain multiplied signals are accordingly obtained, the band combination unit 13 combines together the number K of gain multiplied signals. The resultant signal obtained by combining is outputted to the second speaker 5.

The second speaker 5 produces sound based on the signal obtained by combining; the band division enables the calibration of speaker characteristics with respect to individual bands.

[Modifications]

Although the embodiments of the present invention have been described above, specific configurations are not limited to these embodiments; and needless to say, all changes in design made as appropriate without departing from the spirit and scope of the present invention are intended to be embraced in the present invention.

The different operations described in the embodiments may be successively performed in the order presented, or parallelly or individually performed in accordance with the capacity of the device performing the operations or as needed.

For example, the constituent elements of the device for speaker calibration can exchange data directly or via a storage unit not illustrated in the drawings.

[Program and Recording Medium]

Figure 7:
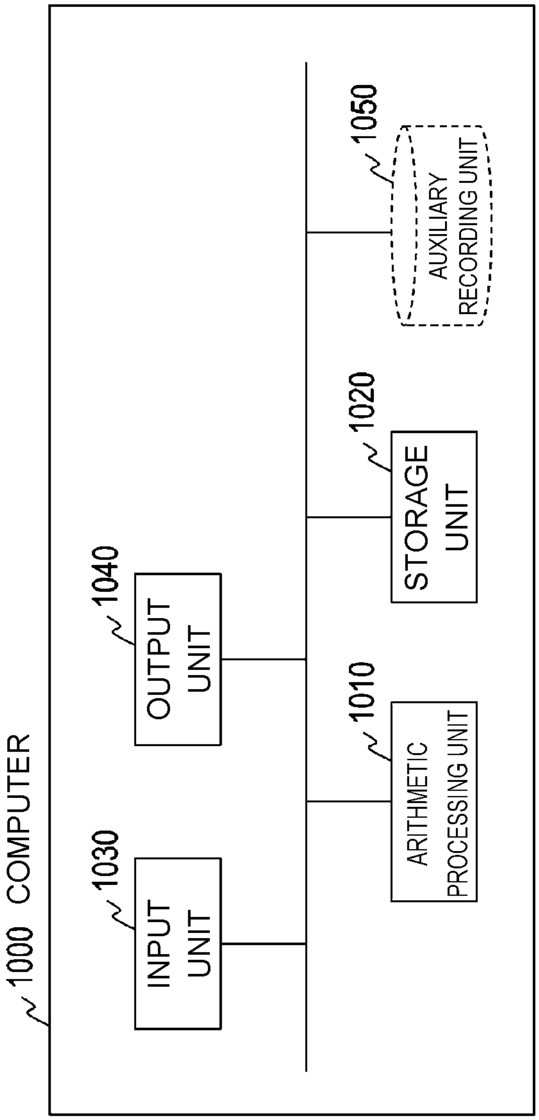
FIG. 7 illustrates an example of a functional configuration of a computer.

The operations of the units of the devices may be implemented by a computer. In this case, the operation details of the functions to be implemented by the devices are written in a program. The computer can implement the different operational functions of the operations of the devices by causing a storage unit 1020 of the computer illustrated in FIG. 7 to store the program and causing units including an arithmetic processing unit 1010, an input unit 1030, and an output unit 1040 to perform the operations.

The program including the operation details may be recorded on a computer-readable recording medium. The computer-readable recording medium may be, for example, a non-transitory recording medium, and specifically, for example, a magnetic storage device or optical disk.

This program may be distributed by, for example, selling, transferring, or lending a portable recording medium storing the program, such as a digital versatile disc (DVD) or compact disc read-only memory (CD-ROM). Alternatively, this program may be distributed by being transferred to a computer through a network from a server computer having a storage device storing the program.

For example, the computer configured to run the program firstly stores the program recorded in the portable recording medium or transferred from the server computer in an auxiliary recording unit 1050 serving as a non-transitory storage device of the computer. When performing the operations, the computer causes the storage unit 1020 to retrieve the program stored in the auxiliary recording unit 1050 serving as its non-transitory storage device and performs the operations according to the retrieved program. Another example of implementing this program is that the computer causes the storage unit 1020 to directly retrieve the program from the portable recording medium and performs the operations according to the program. The program may be sequentially transferred from the server computer, and the computer may sequentially perform the operation according to the received program. Instead of transferring the program from the server computer to the computer, the operations described above may be performed by an application service provider (ASP) service that implements operational functions by only providing operational instructions and receiving results. The program in this example includes equivalents of program that include information to be used to perform operations by an electronic computer (for example, data specifying operations of a computer but not including direct instructions for the computer).

Although in this example the devices are configured by a computer running a predetermined program, at least a portion of the operation details may be implemented by hardware.

Additionally, as might be expected, any changes may be made as appropriate without departing from the spirit and scope of the present invention.

The invention claimed is:

1. A method for speaker calibration, comprising:

a first filter processing step in which a first filtered signal is generated by filtering an input signal;

a first speaker processing step in which sound based on the first filtered signal is produced by a first speaker;

a second filter processing step in which a second filtered signal is generated by filtering the input signal;

a gain multiplication step in which a gain multiplied signal is generated by multiplying the second filtered signal by a gain;

a second speaker processing step in which sound based on the gain multiplied signal is produced by a second speaker; and a gain control step in which the gain is controlled such that a root mean square of a collected sound signal collected by a microphone installed at a mute position is smaller than a root mean square of the collected sound without gain control, the mute position being a position at which the sound produced by the first speaker and the sound produced by the second speaker are to be muted.

2. The method for speaker calibration according to claim 1, further comprising:

a first low-pass filter processing step in which a first low-pass filtered signal is generated by low-pass filtering the second filtered signal; and a second low-pass filter processing step in which a second low-pass filtered signal is generated by low-pass filtering the collected sound signal, wherein the gain is controlled by using the first low-pass filtered signal and the second low-pass filtered signal such that a root mean square of the second low-pass filtered signal is smaller than a root mean square of the collected sound without gain control.

3. The method for speaker calibration according to claim 1, further comprising:

a delay step in which the second filtered signal is delayed.

4. The method for speaker calibration according to claim 1, further comprising:

a first band division step in which the second filtered signal is divided into a plurality of bands; and a second band division step in which the collected sound signal is divided into a plurality of bands, wherein corresponding operations are performed for individual signal divisions obtained by dividing the second filtered signal under the plurality of bands or individual signal divisions obtained by dividing the collected sound signal under the plurality of bands in the gain multiplication step, the gain control step, the first low-pass filter processing step, the second low-pass filter processing step, and the delay step, the method further comprising:

a band combination step in which multiplied signals generated for the respective bands are combined together, wherein the second speaker produces sound based on the combined signals.

5. A non-transitory computer readable medium that stores a program causing a computer to perform operations of the steps of the method for speaker calibration according to claim 1.

6. A device for speaker calibration, comprising:

processing circuitry;

a first speaker;

a second speaker; and a microphone, wherein the processing circuitry is configured to generate a first filtered signal by filtering an input signal;

the first speaker is configured to produce sound based on the first filtered signal;

the processing circuitry is configured to generate a second filtered signal by filtering the input signal;

the processing circuitry is configured to generate a gain multiplied signal by multiplying the second filtered signal by a gain;

the second speaker is configured to produce sound based on the gain multiplied signal;

the microphone is installed at a mute position at which the sound produced by the first speaker and the sound produced by the second speaker are to be muted; and the processing circuitry is configured to control gain such that a root mean square of a collected sound signal collected by the microphone is smaller than a root mean square of the collected sound without gain control.

* * * * *